(12) United States Patent
Bucey et al.

(10) Patent No.: US 6,701,609 B2
(45) Date of Patent: Mar. 9, 2004

(54) APPARATUS FOR TACK WELDING A RECUPERATOR CELL

(75) Inventors: Charles W. Bucey, San Diego, CA (US); Michael S. Nowak, St. Joseph, MI (US); Bruce D. Harkins, Clear Lake Shores, TX (US)

(73) Assignee: Solar Turbines Inc, San Diego, CA (US)

( * ) Notice: Subject to any disclaimer, the term of this patent is extended or adjusted under 35 U.S.C. 154(b) by 0 days.

(21) Appl. No.: 09/881,519

(22) Filed: Jun. 14, 2001

(65) Prior Publication Data

US 2002/0190034 A1 Dec. 19, 2002

(51) Int. Cl.[7] .................................................. B23P 15/06
(52) U.S. Cl. ...................... 29/726; 29/33 G; 29/890.034
(58) Field of Search ................................ 79/726, 33 G, 79/799, 890.034; 219/117.1

(56) References Cited

U.S. PATENT DOCUMENTS

| | | | |
|---|---|---|---|
| 5,060,721 A | | 10/1991 | Darragh |
| 5,918,368 A | * | 7/1999 | Ervin et al. ............... 29/890.03 |
| 6,112,403 A | * | 9/2000 | Ervin et al. ................ 29/281.5 |
| 6,158,121 A | * | 12/2000 | Ervin et al. .............. 29/860.03 |
| 6,308,409 B1 | * | 10/2001 | Bucey et al. ............ 29/890.03 |
| 6,357,113 B1 | * | 3/2002 | Williams ................. 29/890.34 |

* cited by examiner

*Primary Examiner*—I Cuda Rosenbaum
(74) *Attorney, Agent, or Firm*—Larry G Cain

(57) ABSTRACT

An apparatus for manufacturing a cell of a recuperator wherein the cell includes a plurality of primary surface sheets, a plurality of spacer bars and a pair of guide vanes. A fixture has a top portion and a bottom portion. The top portion is pivotably movable between an open or loading position and a closed or welding position. A plurality of the spacer bars, plurality of primary surface sheets and a pair of guide vanes are positioned in the fixture in a preestablished relationship and are fixedly attached one to another by a tack welding machine. A controller operative controls the tack welding machine.

9 Claims, 8 Drawing Sheets

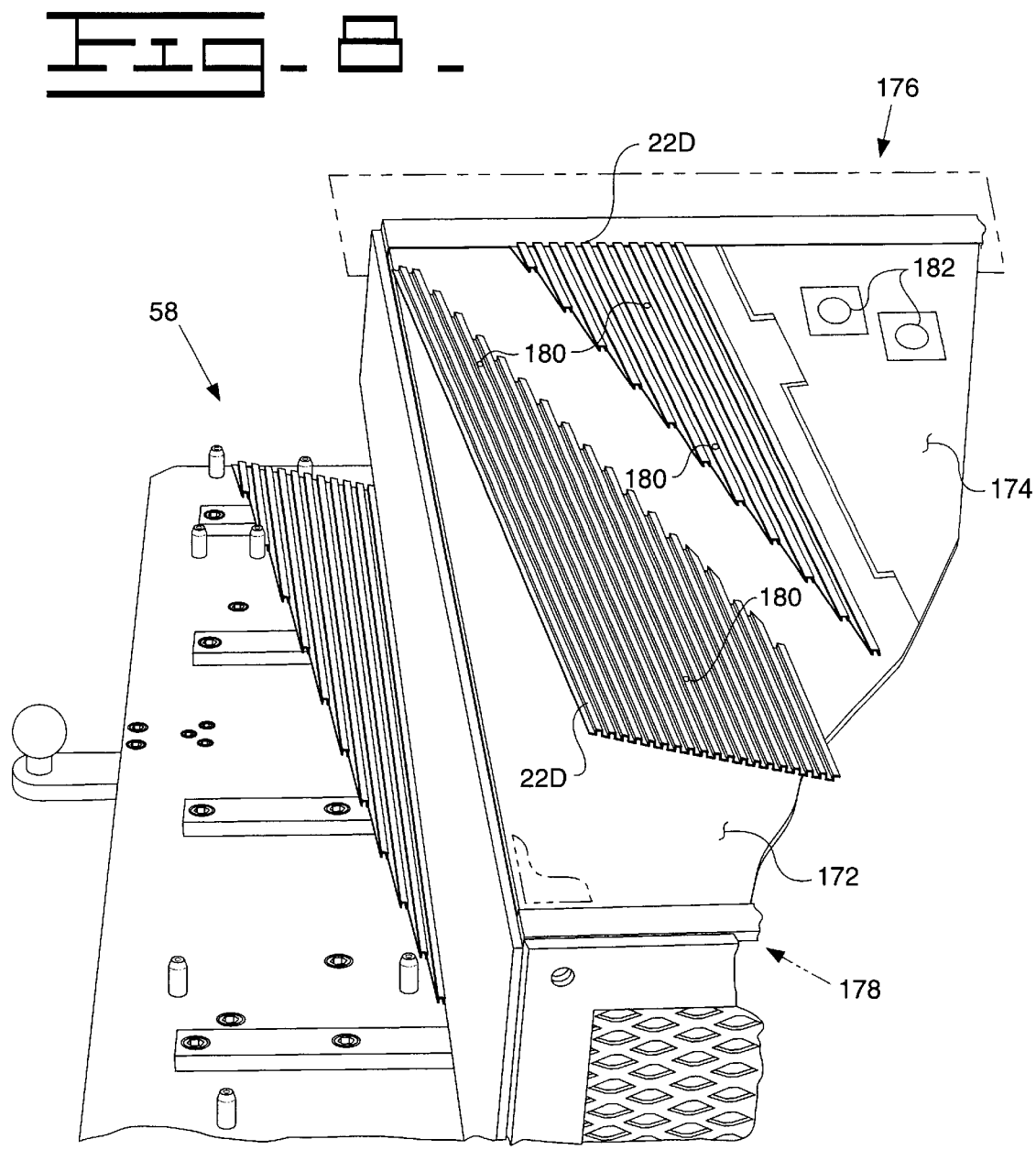

APPARATUS FOR TACK WELDING A RECUPERATOR CELL

TECHNICAL FIELD

This invention relates generally to a heat exchanger or more explicitly to a recuperator and more particularly to an apparatus and method for making up a cell of the recuperator.

BACKGROUND

A recuperator is made from a plurality of cells. The cells are made from a plurality of components parts. Such components being a pair of primary surface sheets having a donor side and a recipient side. A pair of wing portions defining an inlet passage and an outlet passage. In many cells, guide vanes are positioned in the respective wing portions. And, a plurality of spacer bars are positioned between the pair of folded sheets. The components of the cell are welded together. An example of such a welded cell and recuperator is shown in U.S. Pat. No. 5,060,721 issued on Oct. 29, 1991 to Charles T. Darragh.

During the assembly of the cells and the recuperator, the interface of the components are positioned one with respect to another in a preestablished relationship and are welded together. The effectiveness of the positioning and holding process during the welding process used to form the cells is in many instances dependent on the ability to maintain the relationship of the components one to another. The result of maintaining the components relationship may result in a defective cell. For example, in some defective cells the components relationship can result in defective welding and leakage between the donor side and the recipient side. Thus, an effective and efficient process is needed to insure the position and location of the component relationship prior to final welding and during assembly.

The present invention is directed to overcome one or more of the problems as set forth above.

SUMMARY OF THE INVENTION

In one aspect of the invention, an apparatus for assembling a cell of a recuperator is disclosed. The cell has a plurality of components, such components being a plurality of primary surface sheets, a plurality of spacer bars and a pair of guide vanes. The apparatus has a table portion having a back portion and a fixture having a bottom portion and a top portion. The top portion is movable between a closed or welding position and an open or loading position. A tack welding machine is movably attached to the back portion. A glue fixture is in communication with the table portion. The glue fixture has a table and a cover being movable between a loading position and a gluing position. And, a controller is operatively connected to the table portion, the tack welding machine and the glue.

BRIEF DESCRIPTION OF THE DRAWINGS

FIG. 8 is a view of a gluing fixture.

DETAILED DESCRIPTION

Figure 1:
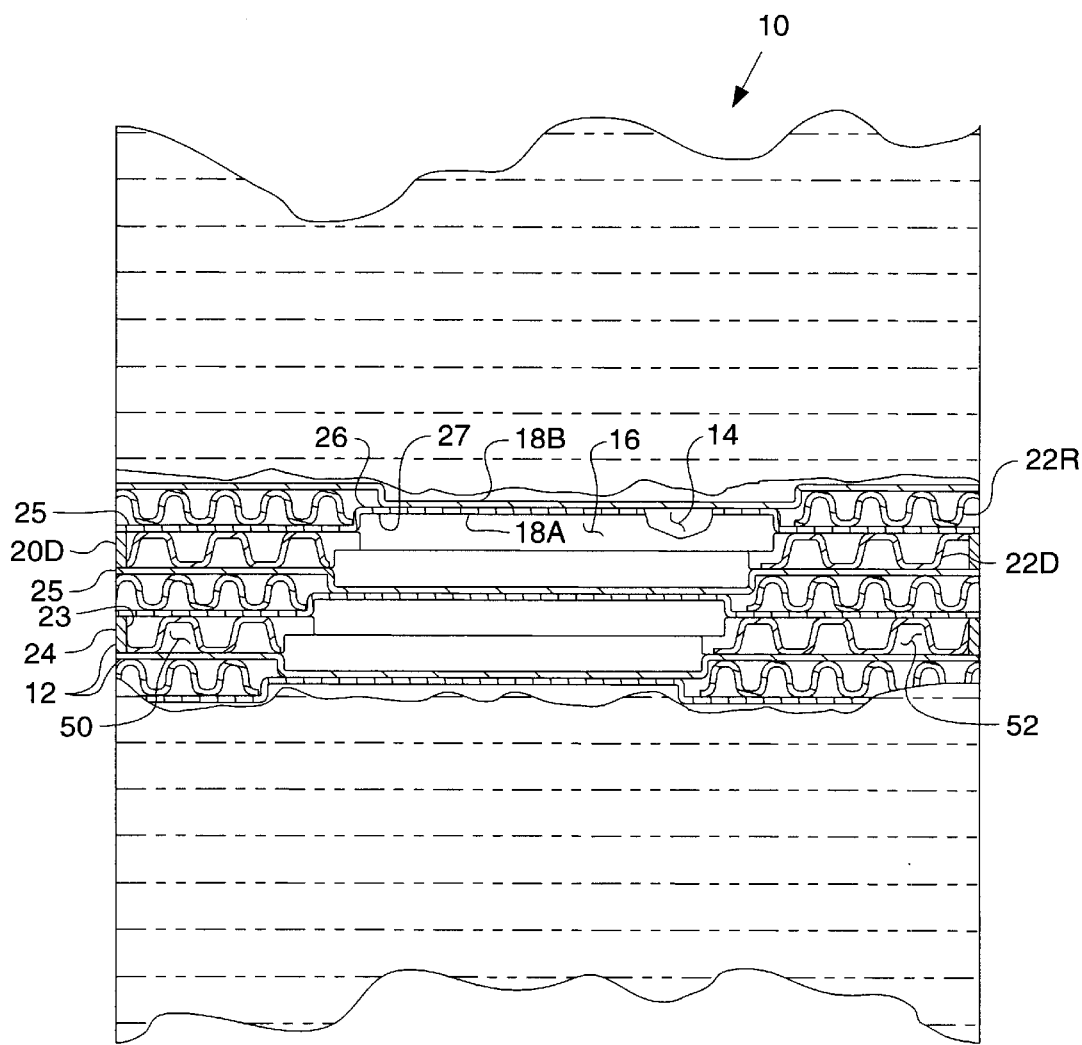
FIG. 1 is a sectional view of a recuperator taken through a plurality of cells.

As best shown in FIG. 1, a recuperator 10 is formed from a plurality of cells 12. The recuperator 10 has a plurality of donor passages 14 and a plurality of recipient passages 16 defined therein. Each of the plurality of cells 12 is made from a plurality of primary surface sheets 18. In this application, a pair of the plurality of primary surface sheets 18 designated as 18A and having a red color code and 18B having a black color code is used in making each cell 12. A plurality of spacer bars 20 and a plurality of guide vanes 22 are also used in making the cell 12. The plurality of spacer bars 20 are divided into a plurality of donor spacer bars 20D and a plurality of recipient spacer bars 20R. And, each of the plurality of spacer bars 20 has a preestablished width "w" extending between a first surface 23 and a second surface 24 and a preestablished thickness "t" extending between a pair of edges 25. The plurality of guide vanes 22 are divided into a donor guide vane 22D having an inlet guide vane and an outlet guide vane and a recipient guide vane 22R having an inlet guide vane and an outlet guide vane.

Figure 2:
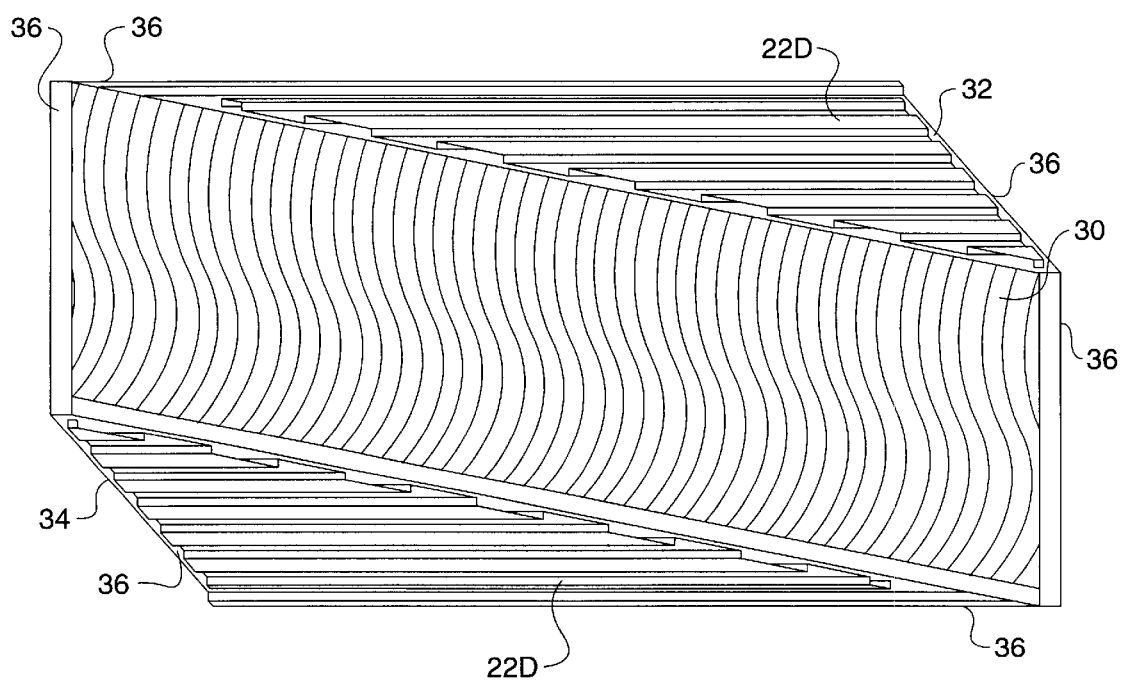
FIG. 2 is a view of one of the plurality of cells partially assembled and used in making the plurality of cells.
Figure 3:
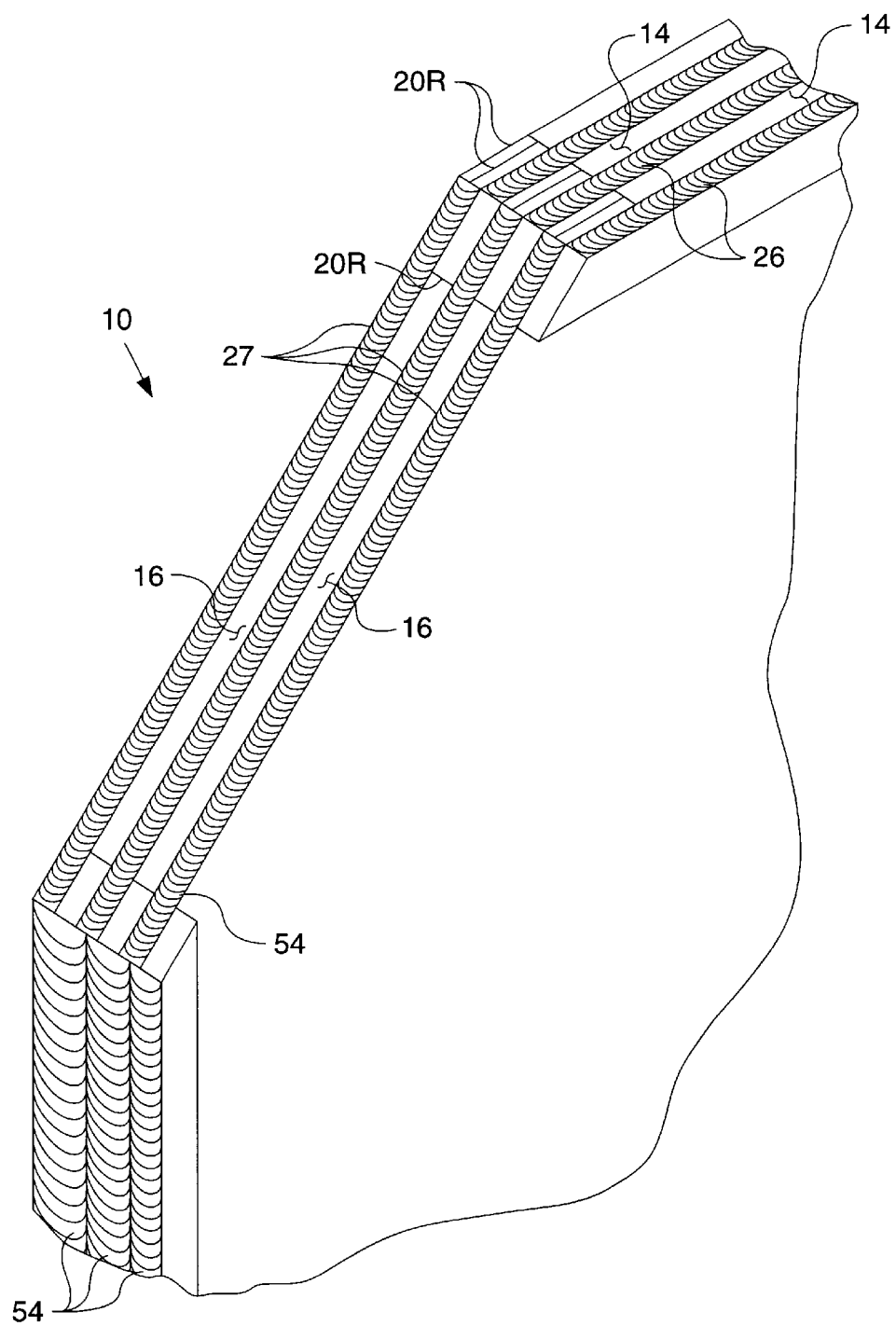
FIG. 3 is a detailed sectional view of the recuperator showing the plurality of cells and a portion of the finished welds thereon.

As best shown in FIGS. 1 and 2, each of the pair of primary surface sheets 18A, 18B is pleated and defines a donor side 26 and a recipient side 27. Each of the plurality of primary surface sheets 18A and 18B has a center portion 30, a first wing portion 32 and a second wing portion 34. In this application, the center portion 30 has a preformed serpentined trapezoidal configuration and each of the first and second wing portions 32,34 has a flattened triangular configuration. As an alternative, other configurations could be used without changing the jest of the invention. Each of the plurality of primary surface sheets 18A and 18B define a plurality of edges 36. The plurality of spacer bars 20 are position on the primary surface sheet 18A and 18B alone the respective one of the plurality of edges 36 in a plurality of precise preestablished locations. As shown in FIGS. 1 and 3, one of the pair of primary surface sheets 18A and 18B on the recipient side 27 has the recipient inlet guide vane 22R attached thereto in the first wing portion 32 in a precise preestablished location. And, the same one of the pair of primary surface sheets 18A and 18B on the recipient side 27 has the recipient outlet guide vane 22R attached thereto in the second wing portion 34. Interposed the first wing portion 32 of the pair of primary surface sheets 18A and 18B is a recipient inlet passage 50 and interposed the second wing portion 34 of the pair of primary surface sheets 18A and 18B is a recipient outlet passage 52. And, as shown in FIG. 3, a plurality of welds 54 are used to complete the assembly of each of the plurality of cells 12. The plurality of cells 12 are further assembled into the recuperator 10.

Figure 4:
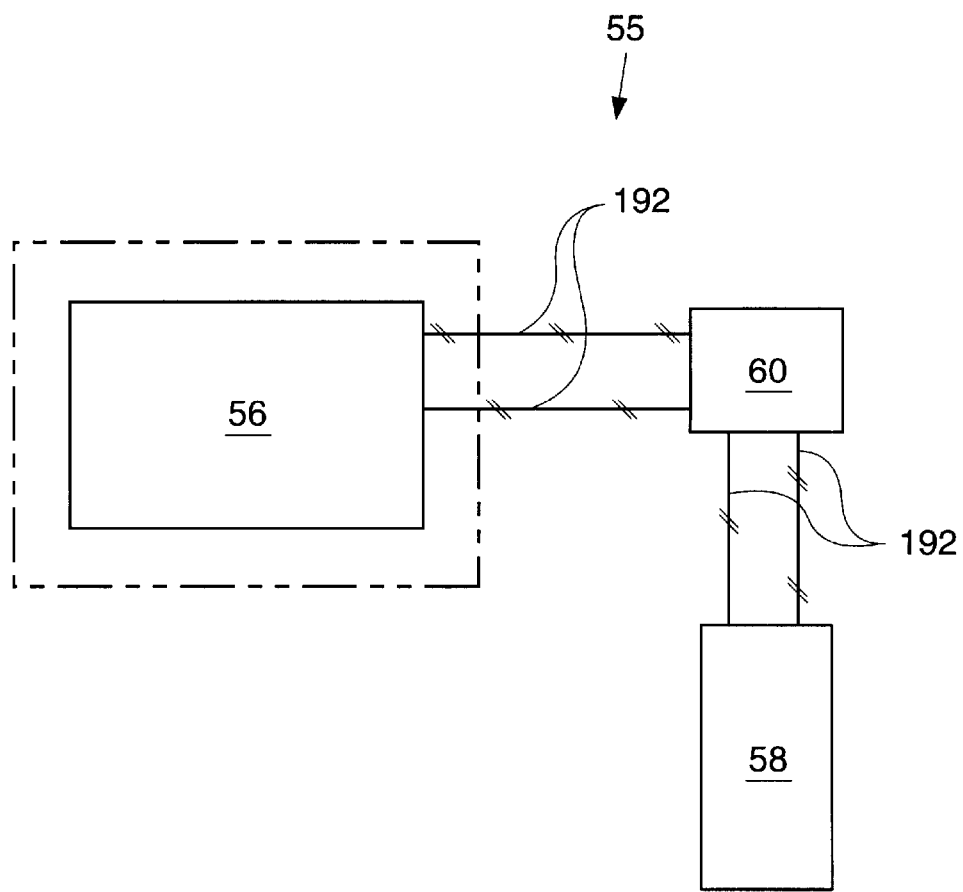
FIG. 4 is a schematically represented view of a tack welding line.
Figure 5:
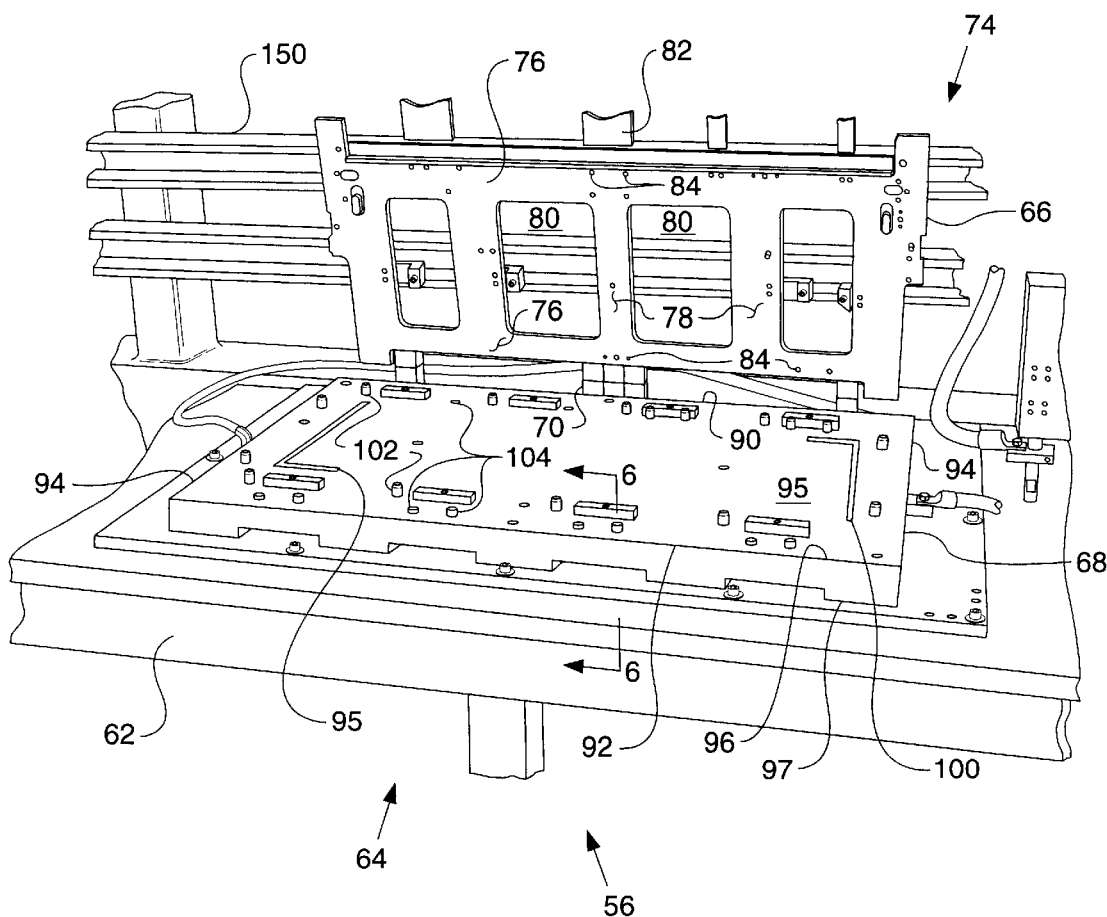
FIG. 5 is a view of a tack welding fixture shown in an open or loading position.
Figure 6:
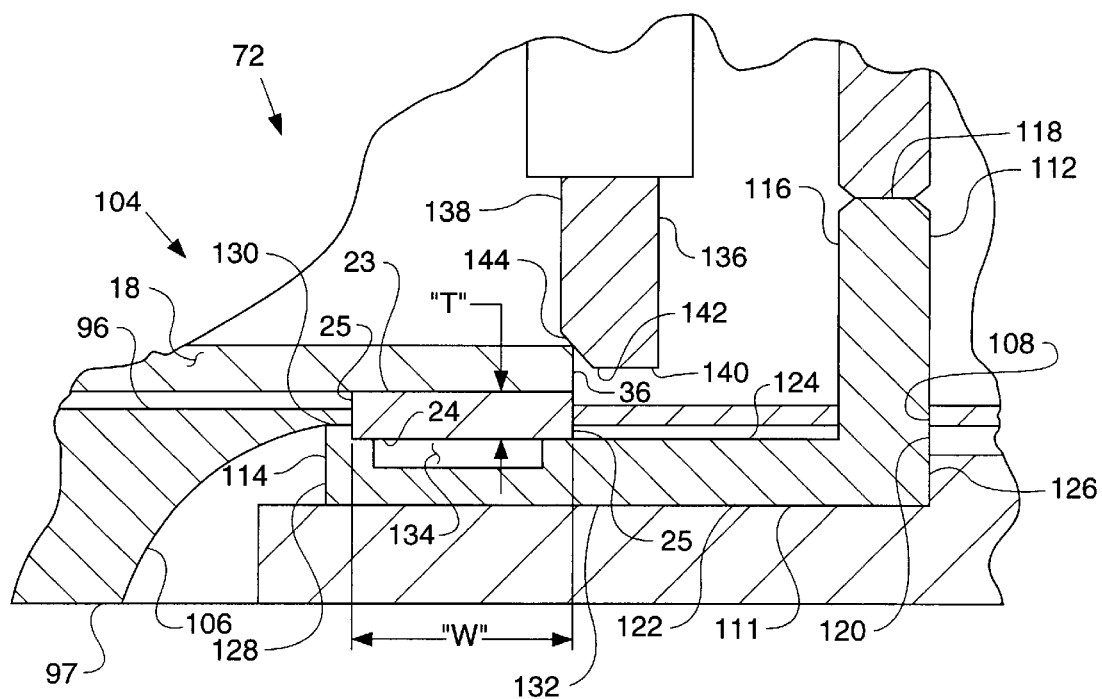
FIG. 6 is a detailed sectional view of a portion of the tack welding fixture taken along line 6—6 of FIG. 5.

As best shown in FIGS. 4, 5 and 6, a welding line 55 is made up of a tack welding machine or station 56, a gluing fixture or station 58 and a controller mechanism 60. The welding line 55 has a main electrical input and a plurality of circuit breakers, not shown. The tack welding station 56 includes a table portion 62 having a fixture 64 positioned thereon. The fixture 64 has a top portion 66 and a bottom portion 68. The top portion 66 and the bottom portion 68 are hinged by a plurality of hinges 70 one to the other. The top portion 66 and the bottom portion 68 form a closed or welding position 72, best shown in FIG. 6, and an open or loading position 74, best shown in FIG. 5.

As best shown in FIG. 5, the top portion 66 has a generally ladder type configuration being formed by a pair of rails 76 spaced apart by a plurality of rungs 78. Interposed the plurality of rungs 78 are a plurality of openings 80. A handle 82 is attached to one of the pair of rails 74 opposite the hinges 70. A plurality of top portion electrodes 84 are positioned axially along the pair of rails 76. The plurality of top portion electrodes 84 are positioned to interface with the pair of primary surface sheets 18A and 18B, and the plurality of spacer bars 20 at predetermined predefined positions.

The bottom portion 68 is made to have a generally rectangular configuration defining a top edge 90, a bottom edge 92 spaced from the top edge 90 a predetermined distance and a pair of ends 94 spaced apart and being interposed the top edge 90 and the bottom edge 92. The top edge 90, the bottom edge 92 and the pair of ends 94 form a generally flat plate 95 having a top surface 96 and a bottom surface 97. As shown in FIG. 5, positioned in the generally flat plate 95 extending from the top surface 96 toward the bottom surface 97 near the top edge 90 and one of the pair of ends 94 is a first generally "L" shaped recess 98. And, positioned in the generally flat plate 95 from the top surface 96 toward the bottom surface 97 near the bottom edge 92 and the other one of the pair of ends 94 is a second generally "L" shaped recess 100. Positioned in the generally flat plate 95 near the top edge 90, the bottom edge 92 and the pair of ends 94 is a plurality of locator pins 102 which extends above the top surface 96. And, positioned in the generally flat plate 95 near the top edge 90, bottom edge 92 and the pair of ends 94 are a plurality of bottom electrodes 104 which correspond to the position of the plurality of top portion electrodes 84 which interface with the pair of primary surface sheets 18A and 18B, and the plurality of spacer bars 20 at predetermined predefined positions.

As best shown in FIG. 6, each of the plurality of bottom electrodes 104 has a rather unique construction. For example, the bottom surface 97 of the bottom portion 68 has a recess 106 cut therein to a preestablished depth toward the top surface 96. A hole 108 extends from the top surface 96 to the recess 106. An electrical transmitting portion 110 of the bottom electrodes 104 is positioned in the recess 106. In this application, the electrical transmitting portion 110 is made of copper. The electrical transmitting portion 110 is a formed plate defining a contacting electrode portion 112 and a grounding electrode portion 114. The contacting electrode portion 112 has a pin portion 116 extending through the hole 108 and has a first end portion 118 extending above the top surface 96 a preestablished distance. A second end portion 120 of the pin portion 116 is attached to a connecting plate 122 on a first side 124 at a first end 126 thereof. A second end 128 of the connecting plate 122 has a raised portion 130 thereon extending away from a second side 132 of the connecting plate 122. The raised portion 130 extends above the first side 124 a preestablished distance being less than the thickness "T" of the spacer bars 20. Interposed the first end 126 and the second end 128 and being positioned in the first side 124 toward the second side 132 is a recess 134. The recess 134 has a width being less than the width "W" of the spacer bars 20. Additionally, each of the plurality of top portion electrodes 84 has a contacting electrode portion 136 thereon. In this application, the contacting electrode portion 136 has a pin 138 extending therefrom. The pin 138 is made of cooper and has an end portion 140 having a unique configuration. For example, the end portion 140 has an end 142 having a chamfer 144 thereon. The chamfer 144 is positioned to be in contacting relationship with the edge 36 of the primary surface sheet 18A and 18B.

Figure 7:
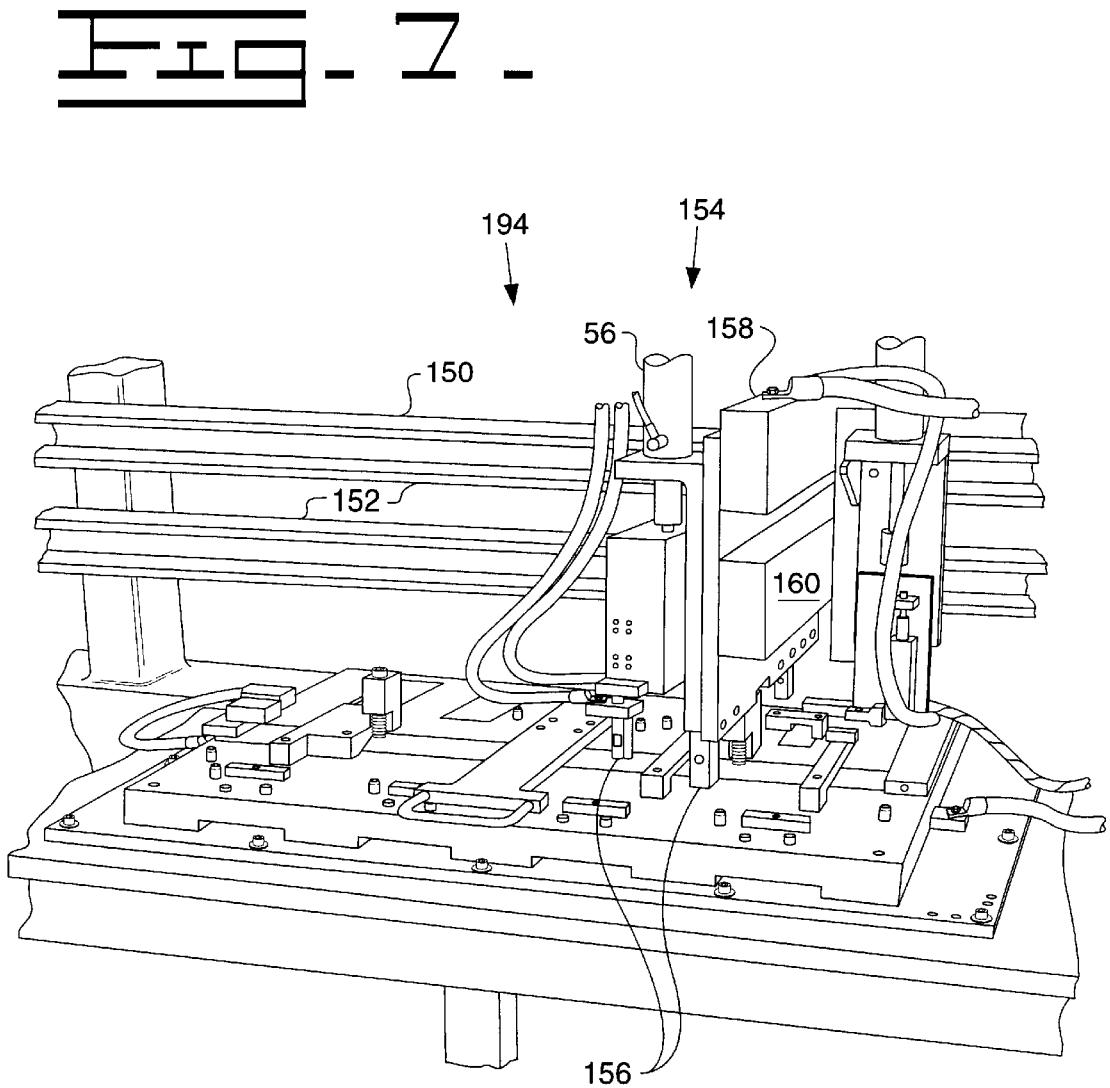
FIG. 7 is a view of the tack welding fixture in a closed or welding position.

As shown in FIGS. 5 and 7, the fixture 64 of the tack welding station 60 has a back portion 150 attached to the table portion 62 behind the hinged top portion 66 and bottom portion 68. The back portion 150 has a plurality of horizontal rails 152 attached thereto. The plurality of horizontal rails 152 has a welding machine 154 slidably attached thereto. The welding machine 154 has a plurality of electrodes 156 which are in communication with the source of main electrical input by way of a safety switch, not shown. The plurality of electrodes 156 correspond in position to that of the plurality of top portion electrodes 84. The welding machine 154 has a motor 158 positioned therein which axially moves the plurality of electrodes 156 along the plurality of horizontal rails 152 to preestablished axial positions and a motor 160 positions the plurality of top portion electrodes 84 into vertical positions for tack welding the interface between the pair of primary surface sheets 18A and 18B, and the plurality of spacer bars 20 at the predetermined predefined positions.

As best shown in FIGS. 4 and 8, the welding line or apparatus 55 has a glue fixture 58 positioned near the tack weld machine 60. The glue fixture 58 has a table 172 therein and a cover 174. The cover 174 moves between a loading position 176 and a gluing position 178, shown in phantom. Glue 180 is dispensed from a nozzle 182 onto each of the pair of the guide vanes 22 in at least two spaced apart positions. The glue 180 is stored in a reservoir, heated and pumped through a supply line in a conventional manner, not shown.

The controller 60, shown in FIG. 4, is operative connected to the weld line 55 in a conventional manner such as a plurality of wires 192. The weld line 55 has a preestablished operating procedure that defines various safety parameter and operations which must be met before the welding operation can be completed. For example, the guide vanes 22 must be positioned on the table 172 and the cover 174 closed before glue 180 can be dispensed onto the guide vanes 22. Additionally, the top portion 66 of the fixture 64 must be in the closed or welding position 72 and the operator must be spaced from the tack welding machine 56 prior to tack welding taking place. And, the controller 60 operatively causes the motor 158 to move the weld machine 56 axially along the plurality of rails 152 to a plurality of welding positions 194, only one being shown, and the motor 160 moves the plurality of top portion electrodes 84 vertically to engage the corresponding ones of the plurality of bottom electrodes 104 with the corresponding ones of the plurality of top portion electrodes 84 which interface with the pair of primary surface pleated sheets 18A and 18B and the plurality of spacer bars 20 at predetermined predefined positions and tack weld the cell 12.

Industrial Applicability

In operation, with the tack welding machine 56 and the plurality of top portion electrodes 84 located beyond one of the pair of ends 94 and the top portion 66 of the fixture 64 in the open or loading position 74, a portion of the plurality of spacer bars 20 are positioned in the first "L" shaped recess 98. Another portion of the plurality of spacer bars 20 are positioned in the second "L" shaped recess 100. In this application a pair of the plurality of spacer bars 20 have been joined to form an "L" shaped spacer bar 20 configuration. However, as an alternative, the portion of the plurality of spacer bars 20 positioned in the first and second "L" shaped recesses 98,100 could be single pieces. Each of the plurality of spacer bars 20 is positioned in contacting relationship with the plurality of electrodes 104 in the bottom portion 68. And, one of the plurality of primary surface sheets 18A is positioned in the fixture 64. The edges 36 are aligned with the locator pins 102 and the top portion 66 is pivoted into the closed or welding position 72. The operator step away from the tack welding machine 54 and activates the controller 60. The motor 180 causes the tack welding machine 56 and the plurality of top portion electrodes 84 to travel axially along the plurality of horizontal rails 152 to one of the plurality of welding positions 194 and the motor 160 causes the tack welding machine 56 and the plurality of top portion electrodes 84 to travel vertically into contact with the edge 36 of one of the respective ones of the plurality of primary surface sheets 18 and the current is activated making the tack weld. After completing the tack weld, the motor 160 vertically retracts the plurality of top portion electrodes 84 and the motor 158 axially moves the welding machine and the plurality of top portion electrodes 84 into another of the plurality of weld positions 194. In this application, the tack weld is made is at several location along or near the edges 36 of the primary surface sheet 18. After completing the tack welds, the motor 158 axially moves the welding machine 56 and the plurality of top portion electrodes 84 beyond the other one of the pair of ends 94 of bottom portion 68.

For example, in greater detail as shown in FIG. 6, the portion of the plurality of spacer bars 20 nearest the pair of edges 25 is in contact with the first side 124 of the connecting plate 122. And, the primary surface sheet 18 is in contact with the plurality of spacer bars 20 near the edge 36. The motor 160 vertically lowers the chamfered end 144 of the contacting electrode portion 112 into contacting relationship with the edge 36 of the primary surface sheet 18 and top portion electrodes 84 is also in contact with the first end portion 118 of the contacting electrode portion 112. Thus, as current from the tack weld machine 56 is transmitted through the respective one of the plurality of top portion electrodes 84 the current passes through the pin 138, the primary surface sheet 18 near the edge 36, through the portion of the respective plurality of spacer bars 20 near one of the pair of edges 25 into the electrical transmitting portion 110, into the pin portion 116 out the first end 118 of the pin portion 116 and completing the circuit to the respective portion of the plurality of top portion electrodes 84. The recess 134, by creating a path of resistance, in the electrical transmitting portion 110 reduces the likelihood of the current passing through the respective one of the plurality of spacer bars 20 to the raised portion 130 or to the electrical transmitting portion 110 near the other of the pair of edges 25.

After the tack welding operation, the operator grasps the handle 82 and moves the top portion 66 into the open or loading position 74. The primary surface sheet 18A with the portion of the plurality of spacer bars 20 tacked thereto is rotated having the recipient side 27 up and reloads into the bottom portion 68 of the fixture 64.

The pair of guide vanes 22 are positioned in the glue fixture 58, the cover 174 is closed and glue 180 is dispensed onto each of the pair of guide vanes 22. One of the pair of guide vanes 22 is removed from the glue fixture 58 and is centered within the first wing portion 32 of the one of the plurality of primary surface sheets 18A. Excess glue 180 is manually squeezed from between the flattened surface on the first wing portion 32 of the one of the plurality of primary surface sheets 18A and the one of the pair of guide vanes 22. Thus, the relative position therebetween is established and maintained fixed therebetween. The other one of the pair of guide vanes 22 is removed from the glue fixture 58 and is centered within the second wing portion 34 of the one of the plurality of primary surface sheets 18A. Excess glue 180 is manually squeezed from between the flattened surface on the second wing portion 34 of the one of the plurality of primary surface sheets 18A and the one of the pair of guide vanes 22. Thus, the relative position therebetween is established and maintained fixed therebetween.

Next, another one of the plurality of primary surface sheets 18B, having a portion of the plurality of spacer bars 22 attached thereto is positioned on top of the pair of guide vanes 22 and the one of the plurality of primary surface sheets 18A. The edges 36 of the one of the primary surface sheets 18B and the plurality of locator pins 102 establish the correct relative position of the one of the primary surface sheets 18B to the other component parts making up the cell 12. The one of the plurality of primary surface sheets 18B has the donor side 26 up resulting in the recipient side 27 of the one of the plurality of primary surface sheets 18A and the recipient side 27 of the one of the plurality of primary surface sheets 18B being facing each other. After the alignment process is completed, the top portion 66 is pivoted into the closed or welding position 72. The operator step away from the tack welding machine 56 and activates the controller 60. The motor 180 causes the tack welding machine 56 and the plurality of top portion electrodes 84 to travel axially along the plurality of horizontal rails 152 to one of the plurality of welding positions 194 and the motor 160 causes the tack welding machine 56 and the plurality of top portion electrodes 84 to travel vertically into contact with the edge 36 of one of the respective ones of the plurality of primary surface sheets 18B and the current is activated making the tack weld. After completing the tack weld, the motor 160 vertically retracts the plurality of top portion electrodes 84 and the motor 158 axially moves the welding machine and the plurality of top portion electrodes 84 into another of the plurality of weld positions 194. In this application, the tack weld is made is at several location, about ten (10), along or near the edges 36 of the primary surface sheet 18B and into the plurality of spacer bars 20 and each of the plurality of primary surface sheets 18A,18B. After completing the tack welds, the motor 158 axially moves the welding machine 54 and the plurality of top portion electrodes 84 beyond the other one of the pair of ends 94 of bottom portion 68.

After the tack welding operation, the operator grasps the handle 82 and moves the top portion 66 into the open or loading position 74. The cell 12 including the pair of the plurality of primary surface sheets 18A and 18B, the portion of the plurality of spacer bars 20 and the pair of guide vanes 22 tack welded therebetween is removed from the fixture 64 and stacked waiting future assembly.

Thus, the method and apparatus as describe above insures the proper position and location of the component parts making up one of the plurality of cells 12 being used to make the recuperator 10. The recesses 98,100 in the fixture 64 positions and located the plurality of spacer bars 20 and the plurality of guide pins 102 positions and locates the one of the plurality of primary surface sheets 18A relative to the plurality of spacer bars 20. And, the gluing of the pair of guide vanes 22 relative to the first and second wing portion 32,34 and the positioning and locating of the one of the primary surface sheets 18B with the guide pins 102 relative to the other component parts insures proper positioning and locating of the plurality of component parts.

Other aspects, objects and advantages of this invention can be obtained from a study of the drawings, the disclosure and the appended claims.

What is claimed is:

1. An apparatus for assembling a cell of a recuperator, said cell having a plurality of components including a plurality of primary surface sheets, a plurality of spacer bars and a pair of guide vanes, said apparatus comprising:

a table portion having a back portion and a fixture having a bottom portion and a top portion, said top portion being movable between a closed or welding position and an open or loading position, in said open or loading position, said back portion and said fixture being adapted to receive a portion of said plurality of primary surface sheets, a portion of said plurality of spacer bars and a portion of said pair of guide vanes;

a tack welding machine being movably attached to said back portion, and being adapted to tack weld a portion of said plurality of primary surface sheets, and a portion of said plurality of spacer bars;

a glue fixture being in communication with said table portion, said glue fixture having a table and a cover being movable between a loading position and a gluing position, and in said gluing position being adapted to glue a portion of said pair of guide vanes; and a controller being operatively connected to said table portion, said tack welding machine and said glue fixture.

2. The apparatus for assembling a cell of a recuperator of claim 1, wherein said bottom portion of said table portion has a plurality of recesses therein in which said plurality of spacer bars are preestablished position.

3. The apparatus for assembling a cell of a recuperator of claim 1, wherein said bottom portion of said table portion has a plurality of guide pins therein with which said plurality of primary surface sheets are preestablishly located relative to said plurality of spacer bars.

4. The apparatus for assembling a cell of a recuperator of claim 1, wherein said top portion is hingedly attached to said bottom portion.

5. The apparatus for assembling a cell of a recuperator of claim 1, wherein said tack welding machine is movable in an axial and a vertical direction.

6. The apparatus for assembling a cell of a recuperator of claim 1, wherein said glue fixture deposits a glue to said pair of guide vanes.

7. The apparatus for assembling a cell of a recuperator of claim 6, wherein said glue is deposited in a plurality of location on said pair of guide vanes.

8. The apparatus for assembling a cell of a recuperator of claim 1, wherein said controller has a preestablished operating procedure, said preestablished operating procedure defining a various of safety parameters and operations which must be met prior to said tack welding machine being actuated.

9. The apparatus for assembling a cell of a recuperator of claim 1, wherein said bottom portion includes an electrical transmitting portion having a recess therein and said plurality of spacer bars defining a pair of edges being position in electrical contacting relationship on each side of said recess.

* * * * *